(12) United States Patent
Xin et al.

(10) Patent No.: US 12,040,947 B2
(45) Date of Patent: Jul. 16, 2024

(54) METHOD AND APPARATUS FOR DETERMINING DEVICE INFORMATION, AND SYSTEM

(71) Applicant: HUAWEI TECHNOLOGIES CO., LTD., Guangdong (CN)

(72) Inventors: Yang Xin, Shanghai (CN); Xiaobo Wu, Shenzhen (CN); Weiwei Chong, Shenzhen (CN); Qing Wei, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/707,589

(22) Filed: Mar. 29, 2022

(65) Prior Publication Data

US 2022/0224603 A1    Jul. 14, 2022

Related U.S. Application Data

(63) Continuation of application No. PCT/CN2019/109657, filed on Sep. 30, 2019.

(51) Int. Cl.
*H04L 41/12* (2022.01)
*H04L 41/0853* (2022.01)
*H04L 41/16* (2022.01)

(52) U.S. Cl.
CPC .......... *H04L 41/12* (2013.01); *H04L 41/0853* (2013.01); *H04L 41/16* (2013.01)

(58) Field of Classification Search
CPC .................................................... H04L 41/12
See application file for complete search history.

(56) References Cited

U.S. PATENT DOCUMENTS

| 2007/0258387 A1 | 11/2007 | Patel et al. |
| 2017/0339023 A1 | 11/2017 | Bo et al. |
| 2018/0317079 A1 | 11/2018 | Kang et al. |

(Continued)

FOREIGN PATENT DOCUMENTS

| CN | 108510082 A | 9/2018 |
| CN | 108762768 A | 11/2018 |

(Continued)

OTHER PUBLICATIONS

Extended European Search Report issued in European Application No. 19947578.1 on Aug. 3, 2022, 11 pages.

(Continued)

*Primary Examiner* — Adnan M Mirza
(74) *Attorney, Agent, or Firm* — Fish & Richardson P.C.

(57) ABSTRACT

The present disclosure relates to methods and apparatus for determining device information. In one example method, an inference device sends a first request to a service discovery entity. The first request is used to request information about one or more training devices, and the first request includes an algorithm type or an algorithm identifier of a first model requested by the inference device. The inference device receives the information about the one or more training devices from the service discovery entity. The information about the one or more training devices includes capability information. The inference device determines a first training device from the information about the one or more training devices based on a preset condition.

17 Claims, 6 Drawing Sheets

(56) References Cited

U.S. PATENT DOCUMENTS

2019/0220703 A1    7/2019  Prakash et al.
2019/0222489 A1*   7/2019  Shan .................. H04L 41/5032
2020/0314826 A1*  10/2020  Sharma ............... H04W 72/046

FOREIGN PATENT DOCUMENTS

CN    109600243 A    4/2019
EP      3007369 A1   4/2016

OTHER PUBLICATIONS

PCT International Search Report and Written Opinion issued in International Application No. PCT/CN2019/109657 on Jun. 30, 2020, 17 pages (with English translation).

* cited by examiner

METHOD AND APPARATUS FOR DETERMINING DEVICE INFORMATION, AND SYSTEM

CROSS-REFERENCE TO RELATED APPLICATION

This application is a continuation of International Application No. PCT/CN2019/109657, filed on Sep. 30, 2019. The disclosure of the aforementioned application is hereby incorporated by reference in its entirety.

TECHNICAL FIELD

Embodiments of this application relate to the field of communications technologies, and in particular, to a method and an apparatus for determining device information and a system.

BACKGROUND

Currently, a network data analytics function (Network Data Analytics Function, NWDAF) network element integrates a training module and an inference module. The training module trains a model based on training data, and the inference module generates a data analytics based on a trained model and inference data.

However, because deployment costs of the training module are far higher than deployment costs of the inference module, it may be considered that the training module and the inference module are separately deployed as a training device and an inference device, to reduce deployment costs. The training device with high deployment costs is deployed in a centralized and cloud-based manner, and the inference device with low deployment costs is deployed in a distributed manner. When the training device and the inference device are separately deployed, how the inference device addresses the training device is a technical problem that urgently needs to be resolved.

SUMMARY

Embodiments of this application provide a method and an apparatus for determining device information and a system, so that an inference device can correctly address a training device.

To achieve the foregoing objective, the embodiments of this application provide the following technical solutions.

According to a first aspect, an embodiment of this application provides a method for determining device information, including: An inference device sends, to a service discovery entity, a first request used to request information about one or more training devices. The first request carries first information that includes an algorithm type or an algorithm identifier of a first model requested by the inference device. The inference device receives the information about the one or more training devices from the service discovery entity. The information about the training device includes capability information. The inference device determines a first training device from the information about the one or more training devices based on a preset condition.

This embodiment of this application provides the method for determining device information. After the training device and the inference device are separately deployed, locations, load, and supported AI capabilities of different training devices are different, and the information about the one or more training devices may be registered with the service discovery entity. Therefore, the inference device may be used to provide, to the service discovery entity, the algorithm type (Algorithm Type) or the algorithm identifier (Algorithm ID) of the first model requested by the inference device, so that the inference device obtains the information about the one or more training devices from the service discovery entity, and the inference device can correctly address the one or more training devices. Subsequently, the inference device is assisted to select an appropriate first training device to perform model training. This can ensure a smooth model training process, a fast model training speed, and a strong model generalization capability. In addition, separate deployment of the training device and the inference device can further reduce deployment costs.

In a possible implementation, the capability information provided in this embodiment of this application includes any one or more of the following information: an algorithm type, an algorithm identifier, an algorithm performance evaluation indicator, algorithm convergence time, an algorithm convergence speed, and algorithm confidence. In this way, the inference device can select, based on the capability information, the first training device that meets a requirement of the inference device.

In a possible implementation, the first information further includes any one or more of the following information: location information of the inference device and address information of the inference device. In this way, the service discovery entity can select, based on the location information of the inference device and the address information of the inference device, information about one or more training devices that are relatively close to the inference device.

In a possible implementation, the preset condition includes any one or more of the following: Algorithm convergence time corresponding to an algorithm of the first training device is the fastest in algorithm convergence time corresponding to one or more algorithms of the one or more training devices. Alternatively, an algorithm performance evaluation indicator corresponding to one or more algorithms of the first training device is the highest in algorithm performance evaluation indicators corresponding to one or more algorithms of the one or more training devices. This can improve precision of training the first model by the first training device.

In a possible implementation, the information about the training device further includes any one of the following information: location information and load information. The preset condition may further include: Load of the first training device is the lowest in load of the one or more training devices. The training device with the lowest load is selected as the first training device, so that processing load of the first training device can be reduced.

In a possible implementation, the method provided in this embodiment of this application further includes: The inference device sends, to the first training device, a fourth request used to request information about the first model. The fourth request includes second information, and the second information includes any one or more of the following information corresponding to the first model: the algorithm type, the algorithm identifier, an algorithm performance requirement, a data type, and a data address. The inference device receives the information about the first model from the first training device. The information about the first model includes any one or more of the following information: a model identifier, a model input, and a model parameter. In this way, the first training device can determine, based on the fourth request, a requirement that the first model required by the inference device meets.

In a possible implementation, the information about the first model further includes any one or more of the following information: a model output, additional model information, and a result of a model evaluation indicator. For example, the result of the model evaluation indicator may be an optimal value.

In a possible implementation, the inference device sends, to the service discovery entity, a third request used to register or update the information about the first model. The third request includes any one or more of the following information: an analytics ID Analytics ID corresponding to the first model, and an effective area, a service area, or a coverage area of an analytics corresponding to the first model. In this way, a network element that needs to use a data analytics corresponding to the Analytics ID can subsequently query an address of the inference device from the service discovery entity based on the Analytics ID, and then the network element requests the data analytics from the inference device based on the Analytics ID. The inference device further subscribes to online inference data from a network element that provides data for generating the data analytics. The inference device determines the data analytics based on a model and the obtained online inference data, and sends the data analytics to a consumer network element.

In a possible implementation, the third request further includes location information of the inference device.

According to a second aspect, an embodiment of this application provides a method for determining device information, including: A service discovery entity receives a first request that is from an inference device and used to request information about one or more training devices. The first request carries first information that includes an algorithm type or an algorithm identifier of a first model requested by the inference device. The service discovery entity determines the information about the one or more training devices based on the first information. The information about the training device includes capability information. The service discovery entity sends the information about the one or more training devices to the inference device.

In a possible implementation, the one or more training devices are training devices that support an algorithm type required by the inference device; and/or the one or more training devices are training devices whose distances from the inference device meet a preset requirement.

In a possible implementation, load of the one or more training devices is less than a preset load threshold.

In a possible implementation, the method provided in this embodiment of this application further includes: The service discovery entity receives a second request from a first training device. The second request is used to request to register or update information about the first training device with the service discovery entity, the second request includes any one or more of the following information about the first training device: address information, location information, load, and capability information, and the first training device is any one of the one or more training devices.

In a possible implementation, the method provided in this embodiment of this application further includes: The service discovery entity sends a response message to the first training device. The response message is used to indicate that the information about the first training device is successfully registered or updated.

In a possible implementation, the capability information includes any one or more of the following information: an algorithm type, an algorithm identifier, an algorithm performance evaluation indicator, algorithm convergence time, an algorithm convergence speed, and algorithm confidence.

In a possible implementation, the method provided in this embodiment of this application further includes: The service discovery entity receives a third request from the inference device. The third request is used to register or update the information about the first model, and the third request includes any one or more of the following information: an analytics ID Analytics ID corresponding to the first model, and an effective area, a service area, or a coverage area of an analytics corresponding to the first model.

According to a third aspect, an embodiment of this application provides a method for determining device information, including: A first training device receives a fourth request from an inference device. The fourth request includes second information, and the second information includes any one or more of the following information corresponding to a first model: an algorithm type, an algorithm identifier, an algorithm performance requirement, a data type, and a data address. The first training device determines information about the first model based on the second information. The information about the first model includes any one or more of the following information: a model identifier, a model input, and a model parameter. The first training device sends the information about the first model to the inference device.

In a possible implementation, that the first training device determines information about the first model based on the second information includes: The first training device collects training data based on the data type and the data address. The first training device performs model training on the data based on an algorithm determined by the algorithm identifier, to obtain the information about the first model. A performance indicator of the first model meets the algorithm performance requirement.

In a possible implementation, the information about the first model further includes any one or more of the following information: a model output, additional model information, and a result of a model evaluation indicator.

In a possible implementation, the method provided in this embodiment of this application further includes: The first training device sends a second request of the first training device to a service discovery entity. The second request is used to request to register or update information about the first training device with the service discovery entity, the second request includes any one or more of the following information about the first training device: address information, location information, load, and capability information, and the first training device is any one of one or more training devices.

In a possible implementation, the method provided in this embodiment of this application further includes: The first training device receives a response message from the service discovery entity. The response message is used to indicate that the information about the first training device is successfully registered or updated.

According to a fourth aspect, an embodiment of this application provides an apparatus for determining device information. The apparatus for determining device information can implement the method in any one of the first aspect or the possible implementations of the first aspect, and therefore can also implement beneficial effects in any one of the first aspect or the possible implementations of the first aspect. The apparatus for determining device information may be an inference device, or may be an apparatus that can support the inference device in implementing the method in any one of the first aspect or the possible implementations of the first aspect, for example, a chip applied to the inference device. The apparatus may implement the foregoing method by using software, hardware, or hardware executing corresponding software.

In an example, the apparatus for determining device information includes a communications unit and a processing unit. The communications unit is configured to send, to a service discovery entity, a first request used to request information about one or more training devices. The first request carries first information, and the first information includes an algorithm type or an algorithm identifier of a first model requested by the apparatus. The communications unit is configured to receive the information about the one or more training devices from the service discovery entity. The information about the training device includes capability information. The processing unit is configured to determine a first training device from the information about the one or more training devices based on a preset condition.

In a possible implementation, the capability information provided in this embodiment of this application includes any one or more of the following information: an algorithm type, an algorithm identifier, an algorithm performance evaluation indicator, algorithm convergence time, an algorithm convergence speed, and algorithm confidence.

In a possible implementation, the first information further includes any one or more of the following information: location information of the apparatus and address information of the apparatus.

In a possible implementation, the preset condition includes any one or more of the following: Algorithm convergence time corresponding to an algorithm of the first training device is the fastest in algorithm convergence time corresponding to one or more algorithms of the one or more training devices. Alternatively, an algorithm performance evaluation indicator corresponding to one or more algorithms of the first training device is the highest in algorithm performance evaluation indicators corresponding to one or more algorithms of the one or more training devices.

In a possible implementation, the information about the training device further includes any one of the following information: location information and load information. The preset condition may further include: Load of the first training device is the lowest in load of the one or more training devices.

In a possible implementation, the communications unit is further configured to send, to the first training device, a fourth request used to request information about the first model. The fourth request includes second information. The second information includes any one or more of the following information corresponding to the first model: the algorithm type, the algorithm identifier, an algorithm performance requirement, a data type, and a data address. The communications unit is further configured to receive the information about the first model from the first training device. The information about the first model includes any one or more of the following information: a model identifier, a model input, and a model parameter.

In a possible implementation, the information about the first model further includes any one or more of the following information: a model output, additional model information, and a result of a model evaluation indicator.

In a possible implementation, the communications unit is configured to send a third request to the service discovery entity. The third request is used to register or update the information about the first model, and the third request includes any one or more of the following information: an analytics ID Analytics ID corresponding to the first model, and an effective area, a service area, or a coverage area of an analytics corresponding to the first model.

In a possible implementation, the third request further includes location information of the inference device.

In another example, this embodiment of this application provides the apparatus for determining device information. The apparatus for determining device information may be the inference device, or may be the chip in the inference device. When the apparatus for determining device information is the inference device, the communications unit may be a communications interface. The processing unit may be a processor. The apparatus for determining device information may further include a storage unit. The storage unit may be a memory. The storage unit is configured to store computer program code. The computer program code includes instructions. The processing unit executes the instructions stored in the storage unit, so that the inference device implements the method for determining device information in any one of the first aspect or the possible implementations of the first aspect. When the apparatus for determining device information is the chip in the inference device, the processing unit may be the processor, and the communications unit may be collectively referred to as the communications interface. For example, the communications interface may be an input/output interface, a pin, a circuit, or the like. The processing unit executes the computer program code stored in the storage unit, so that the inference device implements the method for determining device information in any one of the first aspect or the possible implementations of the first aspect. The storage unit may be a storage unit (for example, a register or a cache) in the chip, or may be a storage unit (for example, a read-only memory or a random access memory) that is in an inference device and that is located outside the chip.

Optionally, the processor, the communications interface, and the memory are coupled to each other.

According to a fifth aspect, an embodiment of this application provides an apparatus for determining device information. The apparatus for determining device information can implement the method in any one of the second aspect or the possible implementations of the second aspect, and therefore can also implement beneficial effects in any one of the second aspect or the possible implementations of the second aspect. The apparatus for determining device information may be a service discovery entity or may be an apparatus that can support the service discovery entity in implementing the method in any one of the second aspect or the possible implementations of the second aspect, for example, a chip applied to the service discovery entity. The apparatus may implement the foregoing method by using software, hardware, or hardware executing corresponding software.

In an example, the apparatus for determining device information includes a communications unit and a processing unit. The communications unit is configured to receive, from an inference device, a first request used to request information about one or more training devices. The first request carries first information, and the first information includes an algorithm type or an algorithm identifier of a first model requested by the inference device. The processing unit is configured to determine the information about the one or more training devices based on the first information. The information about the training device includes capability information. The communications unit is further configured to send the information about the one or more training devices to the inference device.

In a possible implementation, the one or more training devices are training devices that support an algorithm type required by the inference device; and/or the one or more training devices are training devices whose distances from the inference device meet a preset requirement.

In a possible implementation, load of the one or more training devices is less than a preset load threshold.

In a possible implementation, the communications unit is further configured to receive a second request from a first training device. The second request is used to request to register or update information about the first training device with the apparatus, the second request includes any one or more of the following information about the first training device: address information, location information, load, and capability information, and the first training device is any one of the one or more training devices.

In a possible implementation, the capability information includes any one or more of the following information: an algorithm type, an algorithm identifier, an algorithm performance evaluation indicator, algorithm convergence time, an algorithm convergence speed, and algorithm confidence.

In a possible implementation, the communications unit is further configured to receive a third request from the inference device. The third request is used to register or update information about the first model, and the third request includes any one or more of the following information: an analytics ID Analytics ID corresponding to the first model, and an effective area, a service area, or a coverage area of an analytics corresponding to the first model.

In another example, this embodiment of this application provides the apparatus for determining device information. The apparatus for determining device information may be the service discovery entity, or may be the chip in the service discovery entity. When the apparatus for determining device information is the service discovery entity, the communications unit may be a communications interface. The processing unit may be a processor. The communications apparatus may further include a storage unit. The storage unit may be a memory. The storage unit is configured to store computer program code. The computer program code includes instructions. The processing unit executes the instructions stored in the storage unit, so that the service discovery entity implements the method for determining device information in any one of the second aspect or the possible implementations of the second aspect. When the apparatus for determining device information is the chip in the service discovery entity, the processing unit may be the processor, and the communications unit may be collectively referred to as the communications interface. For example, the communications interface may be an input/output interface, a pin, a circuit, or the like. The processing unit executes the computer program code stored in the storage unit, so that the service discovery entity implements the method for determining device information in any one of the second aspect or the possible implementations of the second aspect. The storage unit may be a storage unit (for example, a register or a cache) in the chip, or may be a storage unit (for example, a read-only memory or a random access memory) that is in the service discovery entity and that is located outside the chip.

Optionally, the processor, the communications interface, and the memory are coupled to each other.

According to a sixth aspect, an embodiment of this application provides an apparatus for determining device information. The apparatus for determining device information can implement the method in any one of the third aspect or the possible implementations of the third aspect, and therefore can also implement beneficial effects in any one of the third aspect or the possible implementations of the third aspect. The apparatus may be a first training device, or may be an apparatus that can support the first training device in implementing the method in any one of the third aspect or the possible implementations of the third aspect, for example, a chip applied to the first training device. The apparatus may implement the foregoing method by using software, hardware, or hardware executing corresponding software.

In an example, the apparatus for determining device information provided in this embodiment of this application includes a communications unit and a processing unit. The communications unit is configured to receive a fourth request including second information from an inference device. The second information includes any one or more of the following information corresponding to a first model: an algorithm type, an algorithm identifier, an algorithm performance requirement, a data type, and a data address. The processing unit is configured to determine information about the first model based on the second information. The information about the first model includes any one or more of the following information: a model identifier, a model input, and a model parameter. The communications unit is further configured to send the information about the first model to the inference device.

In a possible implementation, that the first training device determines information about the first model based on the second information includes: The first training device collects training data based on the data type and the data address. The first training device performs model training on the data based on an algorithm determined by the algorithm identifier, to obtain the information about the first model. A performance indicator of the first model meets the algorithm performance requirement.

In a possible implementation, the information about the first model further includes any one or more of the following information: a model output, additional model information, and a result of a model evaluation indicator.

In a possible implementation, the communications unit is further configured to send a second request of the first training device to a service discovery entity. The second request is used to request to register or update information about the first training device with the service discovery entity, the second request includes any one or more of the following information about the first training device: address information, location information, load, and capability information, and the first training device is any one of one or more training devices.

In a possible implementation, the communications unit is further configured to receive a response message from the service discovery entity. The response message is used to indicate that the information about the first training device is successfully registered or updated.

According to a seventh aspect, an embodiment of this application provides a computer-readable storage medium. The computer-readable storage medium stores computer programs or instructions. When the computer programs or the instructions are run on a computer, the computer is enabled to perform the method for determining device information in any one of the first aspect or the possible implementations of the first aspect.

According to an eighth aspect, an embodiment of this application provides a computer-readable storage medium. The computer-readable storage medium stores computer programs or instructions. When the computer programs or the instructions are run on a computer, the computer is enabled to perform the method for determining device information in any one of the second aspect or the possible implementations of the second aspect.

According to a ninth aspect, an embodiment of this application provides a computer-readable storage medium. The computer-readable storage medium stores computer programs or instructions. When the computer programs or the instructions are run on a computer, the computer is enabled to perform the method for determining device information in any one of the third aspect or the possible implementations of the third aspect.

According to a tenth aspect, an embodiment of this application provides a computer program product including instructions. When the instructions are run on a computer, the computer is enabled to perform the method for determining device information in any one of the first aspect or the possible implementations of the first aspect.

According to an eleventh aspect, this application provides a computer program product including instructions. When the instructions are run on a computer, the computer is enabled to perform the method for determining device information in any one of the second aspect or the possible implementations of the second aspect.

According to a twelfth aspect, this application provides a computer program product including instructions. When the instructions are run on a computer, the computer is enabled to perform the method for determining device information in any one of the third aspect or the possible implementations of the third aspect.

According to a thirteenth aspect, an embodiment of this application provides a communications apparatus, configured to implement the methods according to the possible designs of any one of the first aspect to the third aspect. The communications apparatus may be the inference device, or an apparatus including the inference device. Alternatively, the communications apparatus may be the service discovery entity, or an apparatus including the service discovery entity. Alternatively, the communications apparatus may be the first training device, or an apparatus including the first training device. The communications apparatus includes a corresponding module, unit, or means (means) for implementing the foregoing method. The module, unit, or means may be implemented by using hardware or software, or implemented by hardware executing corresponding software. The hardware or the software includes one or more modules or units corresponding to the foregoing functions.

According to a fourteenth aspect, an embodiment of this application provides a communications apparatus. The communications apparatus includes at least one processor and a communications interface. When the communications apparatus runs, the processor executes computer-executable instructions stored in the communications apparatus, so that the communications apparatus performs the method according to any one of the possible designs of any one of the first aspect to the third aspect. For example, the communications apparatus may be an inference device, or a chip applied to an inference device. For example, the communications apparatus may be a service discovery entity, or a chip applied to a service discovery entity. For example, the communications apparatus may be a first training device, or a chip applied to a first training device.

It should be understood that the communications apparatus described in the fourteenth aspect may further include a bus and a memory. The memory is configured to store code and data. Optionally, the at least one processor, the communications interface, and the memory are coupled to each other.

According to a fifteenth aspect, an embodiment of this application provides a communications apparatus. The communications apparatus includes a processor and a storage medium. The storage medium stores instructions, and when the instructions are run by the processor, the method for determining device information in any one of the first aspect or the possible implementations of the first aspect is implemented.

According to a sixteenth aspect, an embodiment of this application provides a communications apparatus. The communications apparatus includes a processor and a storage medium. The storage medium stores instructions, and when the instructions are run by the processor, the method for determining device information in any one of the second aspect or the possible implementations of the second aspect is implemented.

According to a seventeenth aspect, an embodiment of this application provides a communications apparatus. The communications apparatus includes a processor and a storage medium. The storage medium stores instructions, and when the instructions are run by the processor, the method for determining device information in any one of the third aspect or the possible implementations of the third aspect is implemented.

According to an eighteenth aspect, an embodiment of this application provides a communications apparatus. The communications apparatus includes a processor. The processor is coupled to a memory, the memory is configured to store instructions or computer programs, and when the instructions or the computer programs are run by the processor, the method for determining device information in any one of the first aspect or the possible implementations of the first aspect is implemented.

According to a nineteenth aspect, an embodiment of this application provides a communications apparatus. The communications apparatus includes a processor. A memory is coupled to the processor, the memory is configured to store instructions or computer programs, and when the instructions or the computer programs are run by the processor, the method for determining device information in any one of the second aspect or the possible implementations of the second aspect is implemented.

According to a twentieth aspect, an embodiment of this application provides a communications apparatus. The communications apparatus includes a processor. A memory is coupled to the processor, the memory is configured to store instructions or computer programs, and when the instructions or the computer programs are run by the processor, the method for determining device information in any one of the third aspect or the possible implementations of the third aspect is implemented.

According to a twenty-first aspect, an embodiment of this application provides a communications apparatus. The communications apparatus includes one or more modules, configured to implement the methods in the first aspect, the second aspect, and the third aspect, and the one or more modules may correspond to the steps in the methods in the first aspect, the second aspect, and the third aspect.

According to a twenty-second aspect, an embodiment of this application provides a chip. The chip includes a processor and a communications interface. The communications interface is coupled to the processor. The processor is configured to run a computer program or instructions, to implement the method for determining device information in any one of the first aspect or the possible implementations of the first aspect. The communications interface is configured to communicate with another module other than the chip.

According to a twenty-third aspect, an embodiment of this application provides a chip. The chip includes a processor and a communications interface. The communications interface is coupled to the processor. The processor is configured to run a computer program or instructions, to implement the method for determining device information in any one of the second aspect or the possible implementations of the second aspect. The communications interface is configured to communicate with another module other than the chip.

According to a twenty-fourth aspect, an embodiment of this application provides a chip. The chip includes a processor and a communications interface. The communications interface is coupled to the processor. The processor is configured to run a computer program or instructions, to implement the method for determining device information in any one of the third aspect or the possible implementations of the third aspect. The communications interface is configured to communicate with another module other than the chip.

Specifically, the chip provided in this embodiment of this application further includes a memory, configured to store the computer program or the instructions.

According to a twenty-fifth aspect, an embodiment of this application provides a communications system. The communications system includes any one of the apparatus according to any one of the fourth aspect or the possible implementations of the fourth aspect and the apparatus according to any one of the fifth aspect or the possible implementations of the fifth aspect.

In an optional implementation, the communications system may further include the apparatus according to any one of the sixth aspect or the possible implementations of the sixth aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

DESCRIPTION OF EMBODIMENTS

Figure 1:
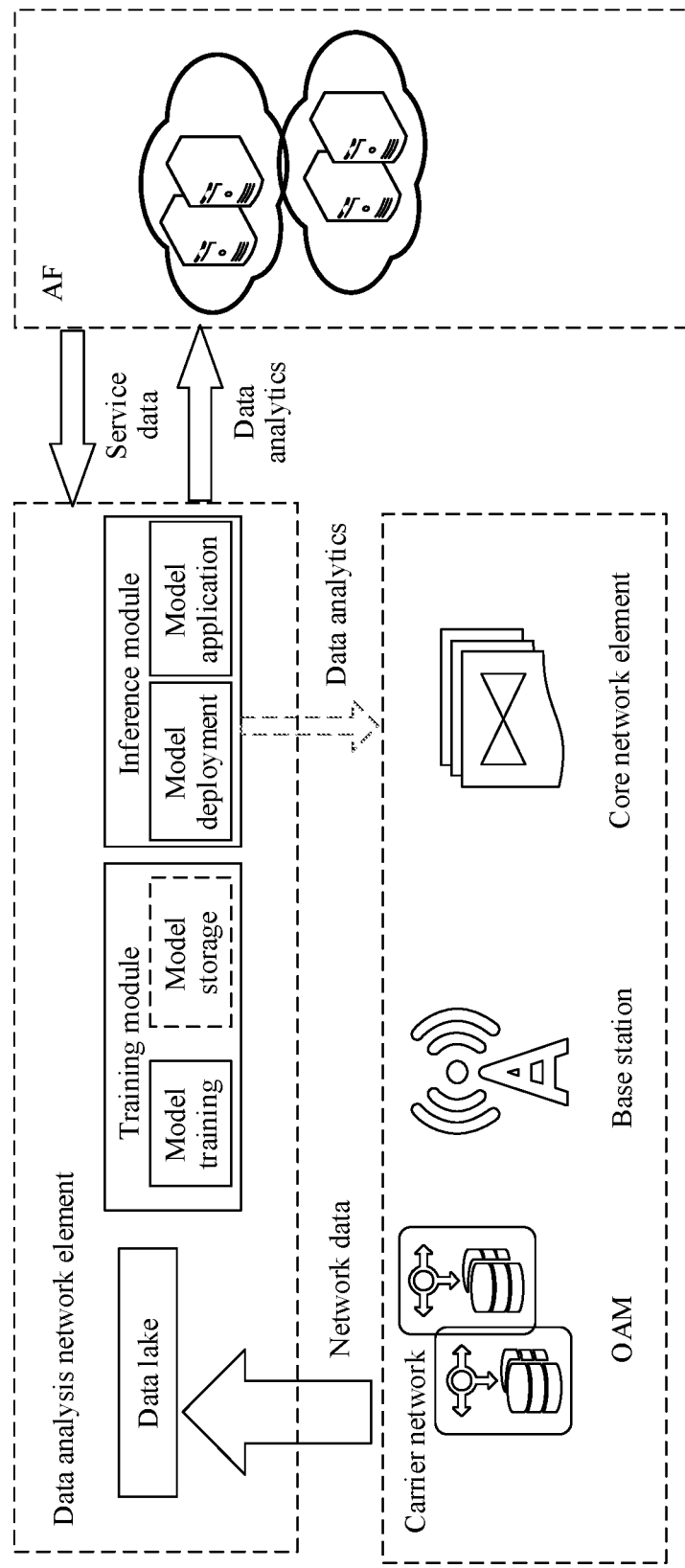
FIG. 1 is an architectural diagram of a current data analysis network element.

To clearly describe the technical solutions in embodiments of this application, words such as "first" and "second" are used in embodiments of this application to distinguish between same items or similar items that provide basically same functions and purposes. For example, a first training device and a second training device are merely intended to distinguish between different training devices, and do not limit a sequence thereof. A person skilled in the art may understand that the words such as "first" and "second" do not limit a quantity or an execution sequence, and the words such as "first" and "second" do not indicate a definite difference.

It should be noted that in this application, the word such as "example" or "for example" is used to represent giving an example, an illustration, or a description. Any embodiment or design scheme described by using "example" or "for example" in this application shall not be construed as being more preferred or more advantageous than another embodiment or design scheme. Exactly, use of the word "example" or "for example" is intended to present a related concept in a specific manner.

In this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. At least one of the following items (pieces) or a similar expression thereof indicates any combination of these items, including any combination of a single item (piece) or a plurality of items (pieces). For example, at least one of a, b, or c may indicate: a, b, c, a and b, a and c, b and c, or a, b, and c, where a, b, and c may be singular or plural.

The technical solutions in embodiments of this application may be applied to various communications systems, for example, code division multiple access (code division multiple access, CDMA), time division multiple access (time division multiple access, TDMA), frequency division multiple access (frequency division multiple access, FDMA), orthogonal frequency division multiple access (orthogonal frequency division multiple access, OFDMA), single carrier frequency division multiple access (single carrier FDMA, SC-FDMA), and another system. Terms "system" and "network" may be interchanged with each other. A new version of the UMTS that uses the E-UTRA is used in long term evolution (long term evolution, LTE) and various versions evolved based on LTE in 3GPP. A 5G communications system and a new radio (new radio, NR) communications system are next-generation communications systems under research. In addition, the communications systems may be further applied to a future-oriented communications technology, and are all applicable to the technical solutions provided in embodiments of this application.

A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of a network architecture and emergence of a new service scenario, the technical solutions provided in embodiments of this application are also applicable to similar technical problems.

As shown in FIG. 1, NWDAF is in a black box mode, integrates the following three components: a data lake (Data lake), an inference module, and a training module, and is in a single deployment mode. The data lake provides functions such as data collection, data preprocessing, and feature engineering. The training module provides functions such as model training and model storage. The inference module provides functions such as model deployment and model application.

Generally, deployment costs of the training module are far higher than deployment costs of the inference module. The following two aspects are considered: The training module has a relatively high requirement on hardware, for example, requires an artificial intelligence (Artificial Intelligence, AI) chip, a large cluster, and a graphics processing unit (Graphics Processing Unit, GPU) computing capability, and the inference module may use a general central processing unit (Central Processing Unit, CPU). In addition, the training module has a relatively high requirement for AI engineering design personnel, especially requires relatively high professional expert experience on feature selection and model training. However, a designer of the inference module only needs to obtain a model description from the training module to deploy the model locally.

Therefore, small- and medium-sized carriers and large-sized carriers have their own requirements on the deployment mode of the NWDAF in consideration of deployment costs. The small- and medium-sized carriers (for example, small-sized carriers in some African countries) expect to separate an AI model training function of an NWDAF network element in Rel-17 from an existing Rel-16 architecture, and then use an AI public cloud (for example, SoftCOM AI) as a training device to implement AI model training. In an actual deployment process, a carrier deploys only an inference device, and then provides data to the training device to implement model training. The inference device obtains the model from the training device, deploys the model locally, and finally generates a data analytics based on the model and local network data.

Similarly, in consideration of costs, a large-sized carrier expects to deploy the NWDAF network element in Rel-17 in a same carrier in a distributed manner. To be specific, an inference function of the NWDAF is deployed in a city, and training devices of the NWDAF network element are deployed in a centralized manner. For example, for China Mobile, it may be considered to deploy a district-level NWDAF training device, and then deploy an NWDAF network element having an inference module at a provincial, municipal, or county level, to reduce the costs.

In FIG. 1, an application function (application function, AF) network element may provide service data (service data) for the NWDAF network element. For example, an operation and maintenance (operation and maintenance) (operation, administration, and maintenance, OAM) network element (which may also be referred to as an operation, administration, and maintenance network element), and a 5G network element (a base station or core network element (for example, an access and mobility management function (access and mobility management function, AMF) network element/policy control function (Policy Control Function) network element/user plane function (User plane function, UPF) network element/session management function (Session Management Function, SMF) network element)) may provide network data (Network Data) for the NWDAF network element.

Figure 2:
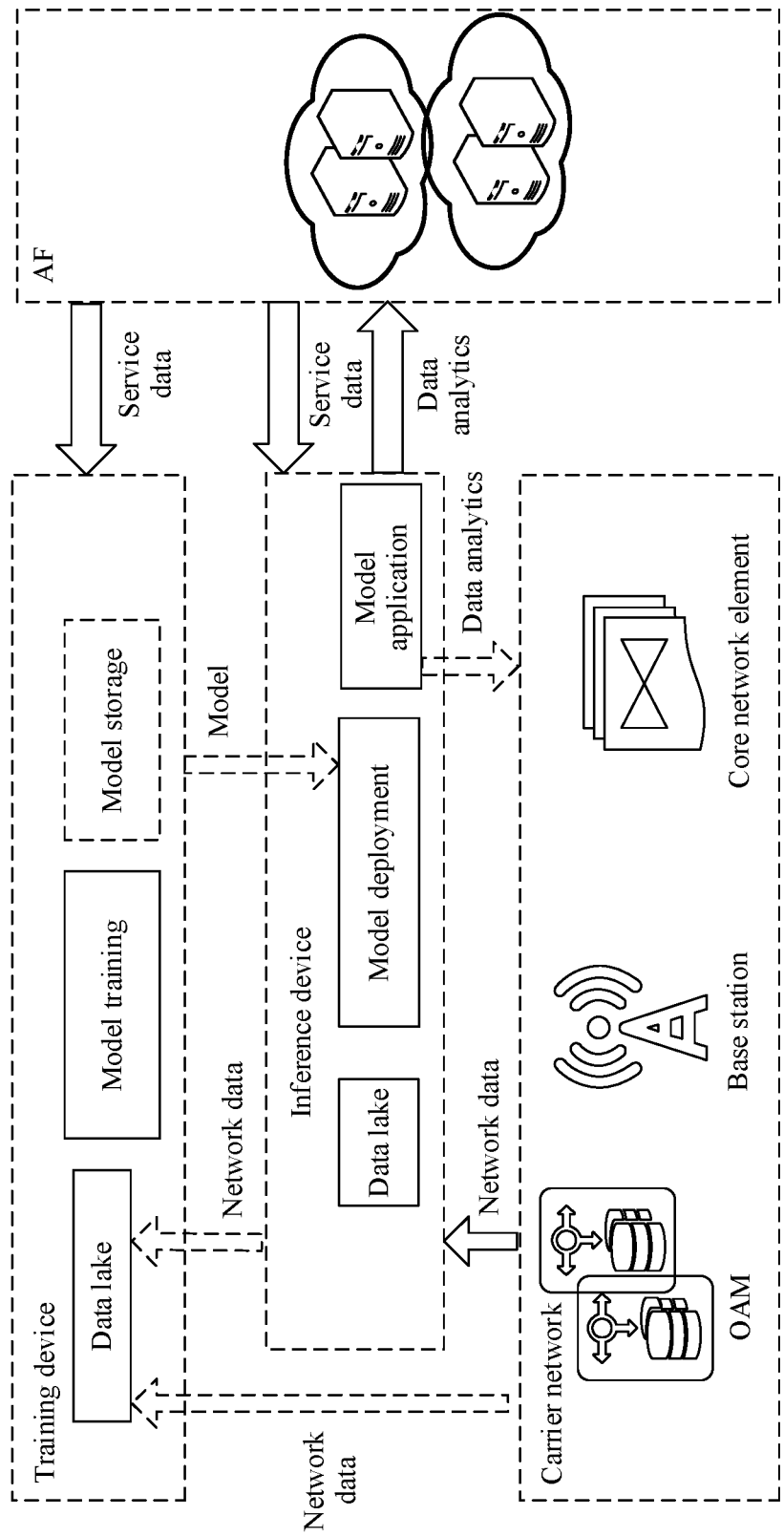
FIG. 2 is a diagram of a scenario according to an embodiment of this application.

Therefore, FIG. 2 shows a network architecture obtained after a training device is separated from an inference device according to an embodiment of this application.

Main functions of a training device separated from an Rel-16 NWDAF network element are as follows: training data collection: obtaining training data from an inference device or a database network element (for example, an application function (application function, AF) network element) or a 5G network element; model training: obtaining an optimal model through training based on the training data, an algorithm, and a training platform (for example, a Huawei network artificial intelligence engine (Network Artificial Intelligence Engine, NAIE), Tensorflow of Google, Caffe of Facebook, or MXnet of Amazon); and model storage: serializing the optimal model obtained through training for storage so that the model can be invoked and requested.

The inference device includes a data lake, model application (Model application), and a model deployment (Model deployment). Main functions of the inference device are as follows: model deployment: requesting and receiving a model from the training device, and installing and deploying the model locally; model input data collection: collecting model input data from a network NE and obtaining the model output based on the model; and model application: determining a data analytics (data Analytics) based on model output verification and data restoration, and preparing a corresponding Analytic ID for a policy network element to request and invoke.

Optionally, a lightweight model training module may be reserved in the inference device, and is used for local training of the inference device. For example, compared with heavyweight model training of the training device, a lightweight model in the inference device does not require massive distributed data storage and distributed data processing, and does not require participation of a large quantity of AI experts.

Figure 3:
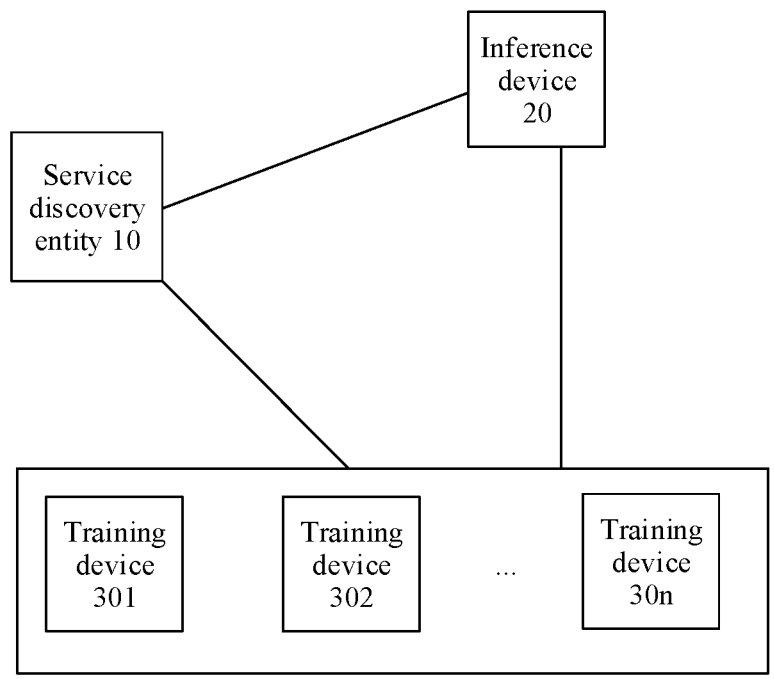
FIG. 3 is a schematic architectural diagram of a communications system according to an embodiment of this application.

FIG. 3 shows a communications system to which a method for determining device information is applied according to an embodiment of this application. The communications system includes a service discovery entity 10 and an inference device 20 communicating with the service discovery entity 10.

In an optional implementation, the communications system may further include one or more training devices (for example, a training device 301, and a training device 302 to a training device 30n). Herein, n is an integer greater than or equal to 1. The inference device 20 may communicate with the one or more training devices. The service discovery entity 10 supports discovery, registration, and authentication functions of a network function or a network service. In the 5GC, the service discovery entity 10 may be a network repository function (network repository function, NRF) network element. For example, the service discovery entity 10 may be a domain name system (Domain Name System, DNS) server.

It should be noted that, in this embodiment of this application, an example in which the service discovery entity 10 is the NRF network element is used. In a future network, the service discovery entity 10 may be the NRF network element or have another name. This is not limited in this application.

The training device has any one of the following functions: registering capability information with the service discovery entity 10, model training, and model storage, where the training device is specifically configured to register address information of the training device, load of the training device, and an algorithm list (including a type, an identifier, additional information, an evaluation indicator, algorithm convergence time, confidence, and the like of each algorithm) supported by the training device with the service discovery entity 10; receiving a model request (including a specific algorithm identifier requirement used by the model and an evaluation indicator requirement of the model) from the inference device 20; and feeding back the model (including a model identifier, an algorithm identifier used by the model, a model input, a model output, a parameter list, a result of a model evaluation indicator—an optimal value, and additional algorithm information) to the inference device 20.

For example, the inference device may be a module that is in a data analysis network element and that has model deployment and model application, or the inference device is a data analysis network element. The data analysis network element may be an NWDAF network element.

The service discovery entity 10 has any one of the following functions: receiving registration information of the training device from the training device, and storing the registration information, where it should be noted that the training device may update initial registration information, especially common variables such as load (load), an algorithm performance indicator, and algorithm convergence time of the training device; receiving an addressing request of the training device from the inference device, to find a suitable address for the training device, where the request may carry an algorithm type to be used and location information of the inference device; and sending an addressing response of the training device to the inference device, which includes the address of the training device, an algorithm identifier of a specific algorithm supported by the training device, an evaluation indicator of the algorithm, algorithm convergence time, confidence, and the like.

The inference device is used for model deployment and model application. Specifically, first, the inference device determines an algorithm type of an algorithm corresponding to a to-be-requested model, and further addresses a suitable training device from the NRF. Then, the inference device requests the model from the training device. For a request parameter and a corresponding model parameter, refer to descriptions of the training device and the following embodiments.

Figure 4:
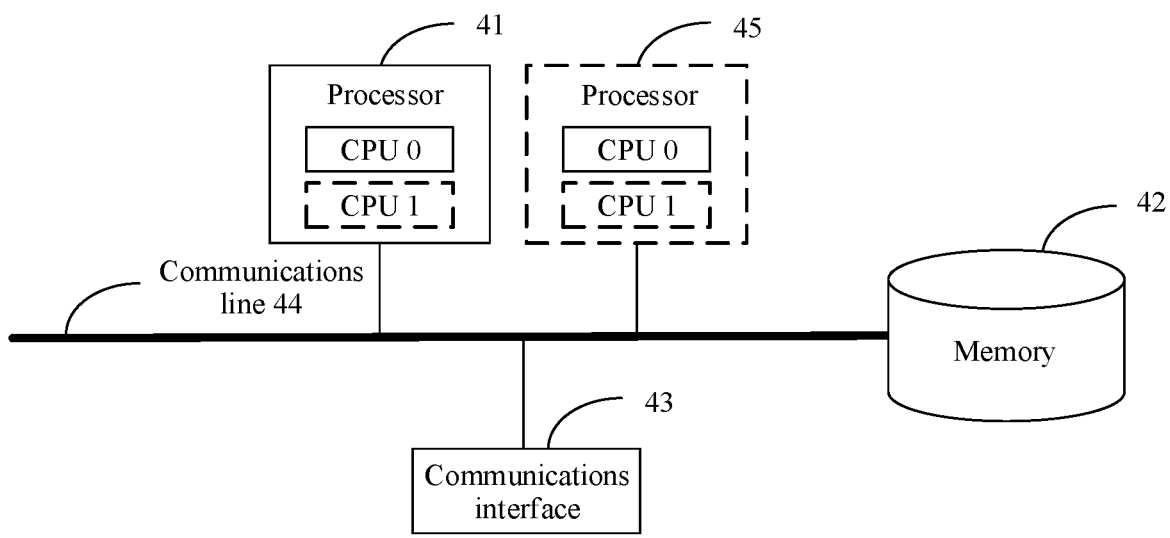
FIG. 4 is a schematic diagram of a structure of a communications device according to an embodiment of this application.

FIG. 4 is a schematic diagram of a hardware structure of a communications device according to an embodiment of this application. For a hardware structure of the service discovery entity 10, the inference device 20, and a training device in embodiments of this application, refer to the schematic diagram of the hardware structure of the communications device shown in FIG. 4. The communications device includes a processor 41, a communications line 44, and at least one communications interface (a communications interface 43 is used as an example in FIG. 4).

The processor 41 may be a general-purpose central processing unit (central processing unit, CPU), a microprocessor, an application-specific integrated circuit (application-specific integrated circuit, ASIC), or one or more integrated circuits configured to control program execution of the solutions of this application.

The communications line 44 may include a path for transferring information between the foregoing components.

The communications interface 43 is configured to communicate with another device or a communications network such as the Ethernet, a radio access network (radio access network, RAN), or a wireless local area network (wireless local area network, WLAN) by using any apparatus such as a transceiver.

Optionally, the communications device may further include a memory 42.

The memory 42 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor through the communications line 44. Alternatively, the memory may be integrated with the processor.

The memory 42 is configured to store computer-executable instructions for executing the solutions of this application, and the processor 41 controls the execution. The processor 41 is configured to execute the computer-executable instructions stored in the memory 42, to implement a method for determining device information provided in the following embodiments of this application.

Optionally, the computer-executable instructions in this embodiment of this application may also be referred to as application program code. This is not specifically limited in this embodiment of this application.

During specific implementation, in an embodiment, the processor 41 may include one or more CPUs, for example, a CPU 0 and a CPU 1 in FIG. 4.

During specific implementation, in an embodiment, the communications device may include a plurality of processors, such as the processor 41 and a processor 45 in FIG. 4. Each of the processors may be a single-core (single-CPU) processor or a multi-core (multi-CPU) processor. The processor herein may be one or more devices, circuits, and/or processing cores configured to process data (for example, computer program instructions).

In embodiments of this application, a specific structure of an execution body of the method for determining device information is not particularly limited in embodiments of this application, provided that a program that records code of the method for determining device information in embodiments of this application may be run to perform communication according to the method for determining device information in embodiments of this application. For example, the execution body of the method for determining device information provided in embodiments of this application may be a service discovery entity, or a communications apparatus applied to a service discovery entity, for example, a chip. This is not limited in this application. Alternatively, the execution body of the method for determining device information provided in embodiments of this application may be an inference device, or a communications apparatus applied to an inference device, for example, a chip. This is not limited in this application. Alternatively, the execution body of the method for determining device information provided in embodiments of this application may be a training device, or a communications apparatus applied to a training device, for example, a chip. This is not limited in this application. The following embodiment is described by using an example in which execution bodies of the method for determining device information are respectively the inference device, the service discovery entity, and the training device.

Figure 5:
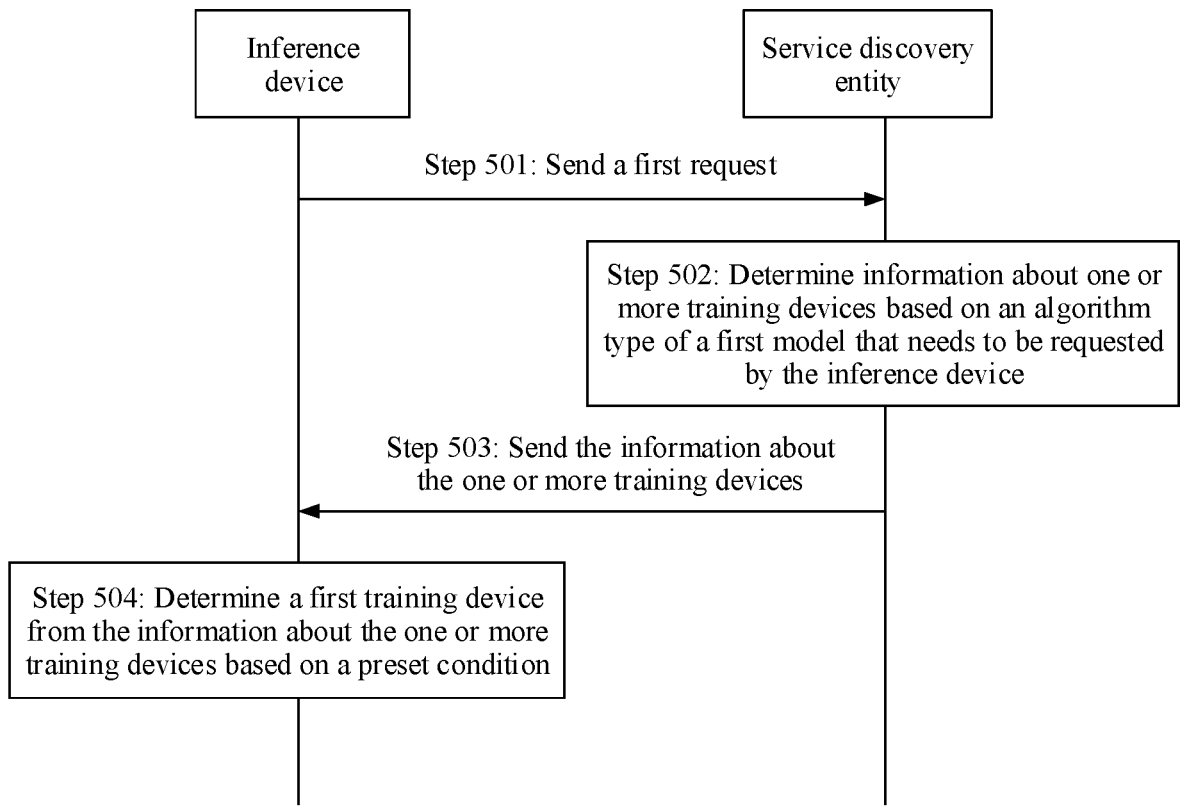
FIG. 5 is a schematic flowchart of a method for determining device information according to an embodiment of this application.

As shown in FIG. 5, with reference to the communications system shown in FIG. 3, an embodiment of this application provides a method for determining device information. The method includes the following steps.

Step 501: An inference device sends a first request to a service discovery entity, so that the service discovery entity receives the first request from the inference device. The first request is used to request information about one or more training devices, and the first request includes an algorithm type (Algorithm Type) or an algorithm identifier (Algorithm ID) of a first model requested by the inference device.

It should be understood that the service discovery entity has a training device set. The training device set includes at least one or more training devices. For a process in which the service discovery entity has the training device set, refer to descriptions in the following embodiment. Details are not described herein again.

For example, the first request may be a service-based network function discovery request (Nnrf_NFDiscovery_Request). For example, the first request may further include any one or more of the following information: location information of the inference device, address information of the inference device, or an identifier of the inference device. Specifically, the first request carries requirement information, and the requirement information is used to request information about one or more training devices that meet a requirement of the inference device. For example, the requirement information includes an algorithm type of the first model requested by the inference device, an algorithm identifier of the first model that needs to be requested by the inference device, the location information of the inference device, the address information of the inference device, or the identifier of the inference device.

The address information of the inference device is used to determine an IP address of the inference device, and the location information of the inference device is used to determine a location or a geographical area of the inference device. The address information of the inference device is used to index or search for the inference device, and the location information of the inference device is used to index an area covered by the inference device.

For example, the algorithm type of the first model requested by the inference device is any one or more of the following algorithm types: regression, clustering, association analysis, classification, and recommendation. Specifically, each algorithm type may correspond to one or more algorithms. For a specific algorithm corresponding to each algorithm type, refer to descriptions in Table 1. Details are not described herein again.

TABLE 1

List of algorithms corresponding to algorithm types and algorithm identifiers

| Algorithm type | Algorithm identifier examples (Algorithm ID) |
| --- | --- |
| Regression | Linear regression (Linear Regression) |
|  | Polynomial regression (Polynomial Regression) |

TABLE 1-continued

List of algorithms corresponding to algorithm types and algorithm identifiers

| Algorithm type | Algorithm identifier examples (Algorithm ID) |
| --- | --- |
|  | Stepwise regression (Stepwise Regression) |
|  | Ridge regression (Ridge Regression) |
|  | Lasso regression (Lasso Regression) |
|  | Elastic network regression (ElasticNet Regression) |
|  | Artificial neural network (Artificial Neural Network) |
| Clustering | K-Means clustering (K-Means) |
|  | Mean shift clustering (Mean shift) |
|  | Density-based clustering method (DBSCAN) |
|  | Expectation-maximization (EM) clustering using Gaussian mixture model (GMM) |
|  | Cohesive hierarchical clustering |
|  | Graph community detection (Graph Community Detection) |
| Association analysis | Apriori algorithm |
|  | FP-tree algorithm |
|  | Algorithm type Algorithm identifier examples (Algorithm ID) |
|  | CHARM algorithm |
|  | DIC algorithm |
|  | H-Mine algorithm |
| Classification | Decision tree (Decision Tree) |
|  | Logistic regression (Logistic Regression) |
|  | Naive Bayesian (Naive Bayesian) |
|  | Artificial neural network (Artificial Neural Network) |
|  | K nearest neighbors (K Nearest Neighbors) |
|  | Support vector machine (Support Vector Machine) |
|  | Classification based on association rules |
|  | Ensemble learning (Ensemble Learning) |
|  | AdaBoost algorithm |
| Recommendation | Popularity-based algorithm |
|  | Collaborative filtering algorithm |
|  | Content-based algorithm |
|  | Model-based algorithm |
|  | Hybrid algorithm |

Generally, the inference device is deployed by a carrier. The carrier decides to trigger a specific data analysis task, preliminarily determines an algorithm type (for example, a classification task or a regression task) required by the data analysis task, and then addresses training data of a training device that meets a requirement by using the inference device of the carrier.

Step 502: The service discovery entity determines the information about the one or more training devices based on the algorithm type of the first model requested by the inference device, where the information about the training device includes capability information.

For example, the capability information includes any one or more of the following information corresponding to any algorithm: an algorithm type, an algorithm identifier, an algorithm performance evaluation indicator, algorithm convergence time, an algorithm convergence speed, and algorithm confidence.

For example, the algorithm convergence speed represents a quantity of iterations used to meet a requirement of a same algorithm performance evaluation indicator.

For example, the algorithm confidence represents a degree of approximation between an output result and a real result. For example, the algorithm performance evaluation indicator may include a square error, accuracy, recall, and an F-Score (an average score obtained after the accuracy and the recall are reconciled).

For example, Table 2 shows algorithm performance indicator measurement manners corresponding to different algorithms.

TABLE 2

Algorithm performance indicator measurement manners corresponding to different algorithms

| Algorithm type | Performance measurement | Algorithm performance indicator measurement manner |
|---|---|---|
| Regression | Sum square error (sum square error, SSE) | $SSE = \sum_{i}^{n}\{f(x) - y_i\}^2$ |
| | Mean absolute error (mean absolute error, MAE) | $MAE = \frac{1}{n}\sum_{i}^{n}|f(x_i) - y_i|$ |
| | Mean square error (mean square error, MSE) | $MSE = \frac{1}{n}\sum_{i}^{n}[f(x_i) - y_i]^2$ |
| | Root mean square error (root mean square error, RMSE) | $RMSE = \sqrt{MSE} = \sqrt{\frac{1}{n}\sum_{i}^{n}[f(x_i) - y_i]^2}$ |
| | Mean absolute percentage error (mean absolute percentage error, MAPE) | $MAPE = \frac{1}{n}\sum_{i}^{n}\left|\frac{f(x_i) - y_i}{y_i}\right|$ |
| | Mean square percentage error (mean square percentage error, MASE) | $MASE = \frac{1}{n}\sum_{i}^{n}\left[\frac{f(x_i) - y_i}{y_i}\right]^2$ |
| Classification | Accuracy and recognition rate | $\frac{TP + TN}{P + N}$ |
| | Error rate and F-Score | $\frac{FP + FN}{P + N}$ |
| | Sensitivity | $\frac{TP}{P}$ |
| | Specificity and true negative rate | $\frac{TN}{N}$ |
| | Precision | $\frac{TP}{TP + FP}$ |
| | F-Score | $\frac{2 * precision * recall}{precision + recall}$ |
| | $F_\beta$ | $\frac{(1 + \beta^2) * precision * recall}{\beta^2 * precision + recall}$ |
| Clustering | The rand index (rand index) needs to provide actual type information C | $RI = \frac{a + b}{C_2^{n_{samples}}}$, where $C_2^{n_{samples}}$ is a total quantity of element pairs that can be formed in a data set, and a value range of RI is [0, 1]. For a random result, it cannot be ensured that a score of RI is close to zero. To ensure that an indicator value is close to 0 when a clustering result is randomly generated, discrimination of the adjusted rand index (Adjusted rand index) is $ARI = \frac{RI - E[RI]}{\max(RI) - E[RI]}$, and a value range of ARI is [0, 1]. |
| | Mutual information (Mutual information) is used to measure a degree of matching of two data distributions. | $H(U) = \sum_{i=1}^{|U|}P(i)\log(P(i)), H(V) = \sum_{j=1}^{|V|}P'(j)\log P'(j)$, where $P(i) = |U_i|/N$, $P'(j) = |V_j|/N$. Mutual information (MI) between U and V is defined as $MI(U, V) = \sum_{i=1}^{|U|}\sum_{j=1}^{|V|}P(i, j)\log\left(\frac{P(i, j)}{P(i)P'(j)}\right)$, where |

TABLE 2-continued

Algorithm performance indicator measurement manners
corresponding to different algorithms

| Algorithm type | Performance measurement | Algorithm performance indicator measurement manner |
|---|---|---|
| | | $P(i, j) = |U_i \cap V_j|/ N$. Normalized mutual information (normalized mutual information, NMI) is $$NMI(U, V) = \frac{MI(U, V)}{\sqrt{H(U)H(V)}},$$ which is similar to ARI. Adjusted mutual information (Adjusted mutual information, AMI) is $$AMI = \frac{MI - E[MI]}{\max(H(U), H(V)) - E[MI]}.$$ To measure a clustering effect by using a mutual information-based method, actual category information is required. A value range of M and NMI is [0, 1]. |
| | Silhouette coefficient (Silhouette coefficient) | This is applicable to a case in which the actual category information is unknown. For a single sample a, if $S = \frac{b-a}{\max(a, b)}$ is overlapped with a sample, a silhouette coefficient of the sample is an average value of silhouette coefficients of all samples. A value range of the silhouette coefficient is [−1,1]. |

TP (True Positive, true positive) represents a positive tuple correctly classified by a classifier; TN (True Negative, true negative) represents a negative tuple correctly classified by the classifier; FP (False Positive, false positive) represents a negative tuple incorrectly marked as a positive tuple; and FN (False Negative, false negative) represents a positive tuple incorrectly marked as a negative tuple. Classifier evaluation measurement includes the accuracy (also referred to as the recognition rate), the sensitivity, or referred to as the recall (recall), the specificity, the precision (precision), F1, and FB.

Step 503: The service discovery entity sends the information about the one or more training devices to the inference device, so that the inference device receives the information about the one or more training devices from the service discovery entity, where the information about the training device includes the capability information.

For example, the service discovery entity may send a first response to the inference device. The first response includes the information about the one or more training devices. For example, the first response may be a service-based network function discovery request response (Nnrf_NFDiscovery_Request response).

For example, the information about the training device may further include any one or more of location information of the training device and load of the training device.

Step 504: The inference device determines a first training device from the information about the one or more training devices based on a preset condition.

Alternatively, step 504 in this embodiment of this application may be implemented in the following manner: The inference device selects any one of the information about the one or more training devices as the first training device.

This embodiment of this application provides the method for determining device information. After the training device and the inference device are separately deployed, locations, load, and supported AI capabilities of different training devices are different, and the information about the one or more training devices may be registered with the service discovery entity. Therefore, the inference device may be used to provide, to the service discovery entity, the algorithm type (Algorithm Type) or the algorithm identifier (Algorithm ID) of the first model requested by the inference device, so that the inference device obtains the information about the one or more training devices from the service discovery entity, and the inference device can correctly address the one or more training devices. Subsequently, the inference device is assisted to select an appropriate first training device to perform model training. This can ensure a smooth model training process, a fast model training speed, and a strong model generalization capability. In addition, separate deployment of the training device and the inference device can further reduce deployment costs.

Figure 6:
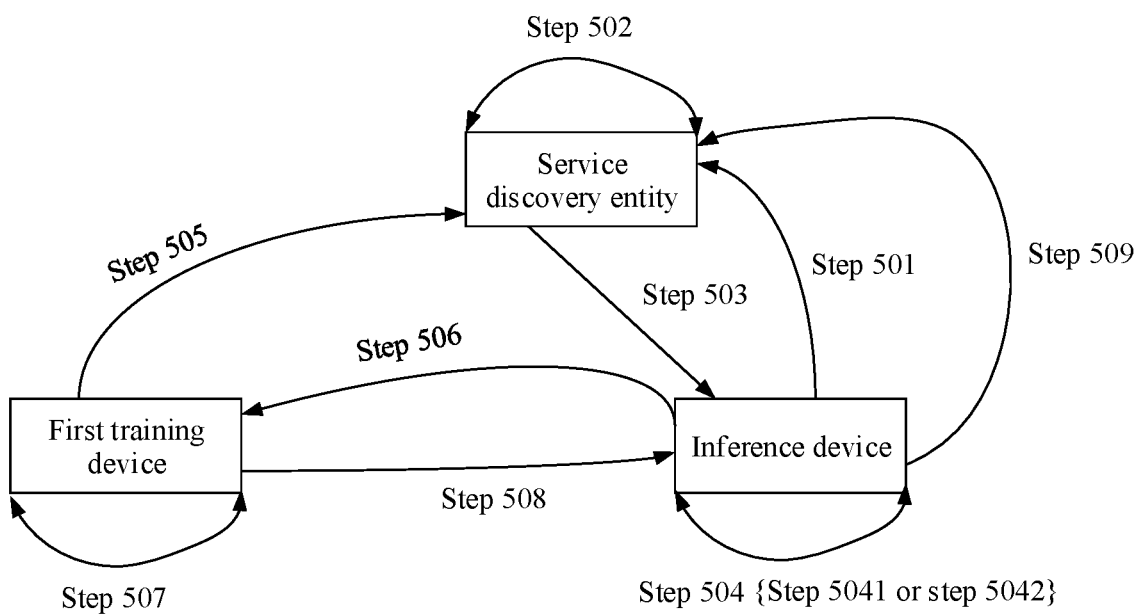
FIG. 6 is a schematic flowchart of another method for determining device information according to an embodiment of this application.

In another possible embodiment, as shown in FIG. 6, before step 502, the method provided in this embodiment of this application may further include the following steps.

Step 505: The first training device or a second training device sends a second request to the service discovery entity, so that the service discovery entity receives the second request from the first training device or the second training device.

The second request from the first training device is used to request to register or update information about the first training device with the service discovery entity, the second request includes any one or more of the following information about the first training device: address information, location information, load, and capability information, and the first training device is any one of the training device set, or the first training device or the second training device is any one of the one or more training devices. The one or more training devices are training devices in the training device set. The second request from the second training device is used to request to register or update information about the second training device with the service discovery entity.

In this embodiment of this application, any training device may register or update the information about the first training device with the service discovery entity through step 505. Therefore, an example in which the first training device registers or updates the information about the first training device with the service discovery entity is used in step 505. In this embodiment of this application, information about any training device may be referred to as artificial intelligence (Artificial Intelligence, AI) information, and a process in which any training device registers or updates the information about the first training device with the service discovery entity is referred to as an AI capability registration process.

In this embodiment of this application, address information of any training device is used to determine an IP address of the training device, and location information of any training device is used to determine a location of the training device, for example, an area in which the training device is located.

For example, the second request has a function of requesting to register or update the information about the first training device with the service discovery entity, or the second request includes indication information, where the indication information is used to request to register or update the information about the first training device with the service discovery entity.

It may be understood that after each training device in the training device set registers or updates the information about the first training device with the service discovery entity, information about each training device is stored in the service discovery entity.

With reference to FIG. 6, step 502 in this embodiment of this application may be implemented in the following manner: The service discovery entity determines the information about the one or more training devices from the training device set based on the algorithm type or the algorithm identifier of the first model requested by the inference device.

In a possible implementation, the one or more training devices are training devices that support an algorithm type required by the inference device; and/or the one or more training devices are training devices whose distances from the inference device meet a preset requirement. For example, the one or more training devices are training devices closest to the inference device.

In another possible implementation, the one or more training devices are training devices whose load is less than a preset load threshold.

In a possible implementation, the one or more training devices are training devices that support an algorithm identifier required by the inference device.

For example, the service discovery entity determines, based on a location of the inference device and from the information about the training device stored in the service discovery entity, the training device set (including the one or more training devices) whose distance to the inference device meets the preset requirement (for example, being closest to the inference device). Then, the service discovery entity filters out, from the training device set based on an algorithm type requirement of the inference device, a training device that does not support the algorithm type requirement. In addition, the service discovery entity may further filter out a training device with heavy load (load), and finally obtain, through filtering, the one or more training devices that meet a requirement of the inference device.

With reference to FIG. 6, in a possible implementation, step 504 in this embodiment of this application may be implemented in the following manner:

Step 5041: The inference device determines, as the first training device, a training device that meets a preset time requirement in algorithm convergence time corresponding to an algorithm in the one or more training devices.

For example, the preset time requirement may be that the algorithm convergence time is the fastest, that is, the algorithm convergence time is the shortest, or the algorithm convergence time meets a preset convergence time threshold. A training device 1 corresponds to algorithm convergence time T1, a training device 2 corresponds to algorithm convergence time T2, and a training device 3 corresponds to algorithm convergence time T3, where T1>T2>T3. In this case, the inference device may determine that the first training device is the training device 3.

Step 5042: The inference device determines, as the first training device, a training device that meets an evaluation indicator requirement in an algorithm performance evaluation indicator corresponding to an algorithm in the one or more training devices.

For example, the evaluation indicator requirement may be that the algorithm performance evaluation indicator is the highest, or the algorithm performance evaluation indicator meets a preset algorithm performance evaluation indicator threshold.

In other words, in a possible implementation, the preset condition provided in this embodiment of this application includes any one or more of the following: Algorithm convergence time corresponding to an algorithm of the first training device is algorithm convergence time that is corresponding to any one of one or more algorithms of the one or more training devices and that meets the preset time requirement. Alternatively, an algorithm performance evaluation indicator corresponding to one or more algorithms of the first training device is an algorithm performance evaluation indicator that is corresponding to one or more algorithms of the one or more training devices and that meets the evaluation indicator requirement.

For example, the algorithm convergence time corresponding to the algorithm of the first training device is the fastest in the algorithm convergence time corresponding to the one or more algorithms of the one or more training devices. Alternatively, the algorithm performance evaluation indicator corresponding to the one or more algorithms of the first training device is the highest in algorithm performance evaluation indicators corresponding to the one or more algorithms of the one or more training devices.

Further, the preset condition provided in this embodiment of this application may further include: load of the first training device meets a load requirement in load of the one or more training devices. For example, meeting a load requirement may be that the load is the lowest, or the load is less than or equal to the preset load threshold.

For example, the load of the first training device is the lowest in the load of the one or more training devices.

In another possible embodiment, as shown in FIG. 6, the method provided in this embodiment of this application further includes the following steps.

Step 506: The inference device sends a fourth request to the first training device, so that the first training device receives the fourth request from the inference device. The fourth request is used to request information about the first model, and the fourth request includes any one or more of the following information corresponding to the first model: the algorithm type, the algorithm identifier, an algorithm performance requirement, a data type (Event ID list), and a data address.

For example, the fourth request carries second information, and the second information is used to request the information about the first model. The second information includes any one or more of the following information corresponding to the first model: the algorithm type, the algorithm identifier, the algorithm performance requirement, the data type (Event ID list), and the data address.

For example, the algorithm identifier carried in the fourth request may be linear regression, a support vector machine, or logistic regression.

The algorithm performance requirement is, for example, the sum square error is less than or equal to 0.001.

For example, the algorithm performance requirement is used to indicate algorithm performance that the first model needs to meet.

For example, the data type may represent one or more data types. The data type is used by the first training device to determine a data type that needs to be collected when the first model is trained. The data address is used to determine an address of data that needs to be collected when the first model is trained. For example, the data address may be an address/IP/ID of a network function (network function, NF) that can provide the data.

Step 507: The first training device determines the information about the first model based on the fourth request. The information about the first model includes any one or more of the following information: a model identifier, a model input, and a model parameter.

In a possible implementation, step 506 in this embodiment of this application may be implemented in the following manner: The first training device collects the training data based on the data type and the data address. The first training device performs model training on the data based on an algorithm determined by the algorithm identifier, to obtain the information about the first model. A performance indicator of the first model meets the algorithm performance requirement.

A voice service mean opinion score (mean opinion score, MOS) model is used as an example. A linear regression algorithm (identified by using an Algorithm ID) corresponding to a simple linear regression model (identified by using a Model ID) is as follows: $h(x)=w_0x_0+w_1x_1+w_2x_2+w_3x_3+w_4x_4+w_5x_5 \ldots +w_Dx_D$. Specifically, h (x) indicates label data, which is also a model output (Model Output list), and may be specifically a voice MOS score; $x_i=(i=0, 1, 2, \ldots, D)$ is training data, which is also model input data (Model Input list), and includes a QoS flow bit rate, a QoS flow packet delay, a QoS flow packet error rate, radio signal received power (radio signal received power, RSRP) or radio signal received quality (radio signal received quality, RSRQ), a power headroom (Power Headroom), a received signal strength indicator (received signal strength indicator, RSSI), a signal to interference plus noise ratio (Signal to Interference plus Noise Ratio, SINR), and the like. $w_i=(i=0, 1, 2, \ldots, D)$ is a weight, which is also the model parameter (Model Parameter list).

In conclusion, a model may be represented by using the following Table 3:

TABLE 3

| Field | Data Type | Description |
| --- | --- | --- |
| > Model identifier (Model ID) | Integer | Model ID (Different models can be obtained based on different data sets by using a same algorithm. Therefore, the model identifier is mandatory.) |
| > Algorithm ID | Integer | Algorithm identifier (uniquely identifying one algorithm) |
| > Model input list (Model Input list) | | Model input, data type list |

TABLE 3-continued

| Field | Data Type | Description |
| --- | --- | --- |
| >> Event ID | Integer | A feature of a model |
| >> Pre-Process Function ID | Integer | Data pre-processing method: used to process raw data to obtain a function (method) identifier of a feature |
| > Model output list (Model Output list) | | Model input, data type list |
| >> Model output (Model Output) | Floating-point number | Pre-processed output result, for example, normalization |
| >> Pre-Process Function ID | Integer | Data pre-processing method: a method for restoring the output result to a true data analytics |
| > Model parameter list (Model Parameter list) | | |
| >> Weight (Weight) | Floating-point number | Pre-processed regression coefficient, for example, normalization |
| >> Pre-Process Function ID | Integer | Data pre-processing method: restoring the pre-processed regression co-efficient to a true regression coefficient |

The model parameter list, the weight, and the Pre-Process Function ID in Table 3 correspond to $w_i=(i=0, 1, 2, \ldots, D)$. The model output list, the model output, and the Pre-Process Function ID in Table 3 correspond to h(x). The model input list, the Pre-Process Function ID, and the Event ID in Table 3 correspond to $x_i=(i=0, 1, 2, \ldots, D)$.

Table 4 shows model representations listed in this embodiment of this application.

TABLE 4

| Model type | |
| --- | --- |
| Linear regression model | Model input: feature vector X indicator, corresponding feature method (optional)<br>Model output: regression value Z indicator<br>Model identifier + algorithm identifier<br>Trained regression coefficient: $w^T$<br>Constant term: b<br>Step function: NONE |
| Logistic regression model | Model input: feature vector X indicator, corresponding feature method (optional)<br>Model output: classification result Z<br>Model identifier + algorithm identifier<br>Trained regression coefficient: vector w^T<br>Constant term: b<br>Non-linear function: SIGMOID, a step function, and a logarithmic equation<br>Step function value separation interval threshold, for example, 0.5, that is, a value is set to 1 when being greater than 0.5, and a value is set to 0 when being less than 0.5. It may also be multi-class. In this case, more than one threshold exists. |
| Decision tree model | Model input: feature and feature method<br>Model output: classification result Z<br>Model identifier + algorithm identifier<br>Model description: tree-like classification structure {'no surfacing': {0: 'no', 1: {'flippers': {0: 'no', 1: 'yes'}}}} |
| Random forest model | Model input: feature and feature method<br>Model output: classification result Z<br>Model identifier + algorithm identifier<br>Model description: several decision trees {'no surfacing': {0: 'no', 1: {'flippers': {0: 'no', 1: 'yes'}}}}<br>Voting method |
| Support vector machine model | Model input: feature and feature method (xi)<br>Model identifier + algorithm identifier<br>Trained support vector: SVs(x)<br>Lagrangian coefficient corresponding to the trained support vector: αs<br>Label value corresponding to the support vector: SV Label(y) |

TABLE 4-continued

| Model type | |
|---|---|
| | Kernel function method: k is, for example, RBF
Kernel function parameter: for example, a polynomial parameter, a Gaussian kernel bandwidth, or the like, which needs to match the kernel function method
Constant term: b
Prediction value classification method: for example, a Sign method |
| Bayesian classifier model | Input layer feature and feature method
Model identifier + algorithm identifier
P(Y) classification type prior probability list
Maximum likelihood estimation list of P(Xi|Y) feature value |
| Neural network model | Input layer feature and feature method
Output layer network element and value
Model identifier + algorithm identifier
Weight list corresponding to each output layer network element and hidden layer network element
Activation function used by each layer
Output algorithm of output layer network element |

Table 5 shows the pre-processing method listed in this embodiment of this application.

TABLE 5

| | Pre-processing method | |
|---|---|---|
| Type | Feature engineering method | Parameter |
| Change of scale | Log2, lg, ln, abs, sqrt, square, cube | Data type |
| Feature discretization | Binarize (binarization) | Data type, threshold |
| | Isometric discretization | Data type, discrete interval |
| | Equal frequency discretization | Data type, discrete interval |
| Abnormal smoothing | Z-score (normal distribution) | Data type, confidence interval, standard deviation, average value |
| | Threshold smoothing | Data type, minThresh, maxThresh |
| Normalization | Min Max Scale | Data type, Min, Max |
| | Z-score | Data type list xT |
| Standardization | Standard scale | Data type, average value, standard deviation |
| Dimension reduction | Average (Avg), minimum (Min), maximum (Max), sum (Sum), others (Others) | Data type list xT |

Step 508: The first training device sends the information about the first model to the inference device, so that the inference device receives the information about the first model from the first training device.

For example, the information about the first model further includes any one or more of the following information: a model output, additional model information, and a result of a model evaluation indicator.

The result of the model evaluation indicator is an optimal value of the model evaluation indicator, for example, 0.0003. For example, for a neural network, the additional model information includes a quantity of hidden layers and an activation function used at each layer.

It should be understood that after step 507, the inference device may deploy the first model based on the information about the first model.

With reference to FIG. 6, in a possible embodiment, after step 508, the method provided in this embodiment of this application may further include the following step.

Step 509: The inference device sends a third request to the service discovery entity, so that the service discovery entity receives the third request from the inference device. The third request is used to register or update the information about the first model. The third request includes any one or more of the following information: an analytics ID Analytics ID corresponding to the first model, and an effective area, a service area, or a coverage area of an analytics corresponding to the first model.

In a possible embodiment, the third request may further include the address information, the location information, or the identifier of the inference device. In a possible embodiment, the third request carries a registration indication or an update indication. The registration indication is used to indicate to register the information about the first model. The update indication is used to indicate to update the information about the first model.

Subsequently, a network element that needs to use a data analytics corresponding to the Analytics ID queries an address of the inference device from the service discovery entity based on the Analytics ID, and then the network element requests the data analytics from the inference device based on the Analytics ID. The inference device further subscribes to online inference data from a network element that provides data for generating the data analytics. The inference device determines the data analytics based on a model and the obtained online inference data, and sends the data analytics to a consumer network element.

The foregoing mainly describes the solutions in embodiments of this application from a perspective of interaction between network elements. It may be understood that, to implement the foregoing functions, each network element, such as the first training device, the inference device, and the service discovery entity, includes a corresponding hardware structure and/or software module for performing each function. A person skilled in the art should be easily aware that, in combination with the examples of units and algorithm steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first training device, the inference device, and the service discovery entity may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that, in embodiments of this application, division into units is an example, and is merely logical function division. In actual implementation, another division manner may be used.

The foregoing describes the methods in embodiments of this application with reference to FIG. 1 to FIG. 6. The following describes apparatuses for determining device information that perform the foregoing methods and that are provided in embodiments of this application. A person skilled in the art may understand that the method and the apparatus may be mutually combined and referenced. The apparatus for determining device information provided in embodiments of this application may perform the steps performed by the inference device, the service discovery entity, or the first training device in the foregoing method for determining a device in which a model is located.

Figure 7:
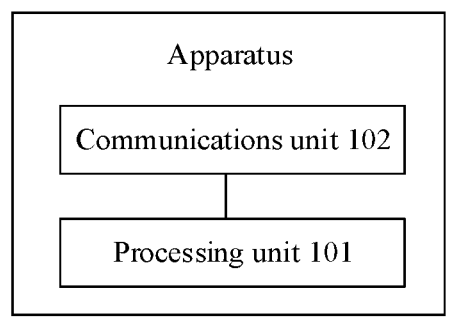
FIG. 7 is a schematic diagram of a structure of an apparatus according to an embodiment of this application.

When an integrated unit is used, FIG. 7 shows an apparatus for determining device information in the foregoing embodiments. The apparatus for determining device information may include a processing unit 101 and a communications unit 102.

In an example, the apparatus for determining device information is an inference device, or a chip applied to an inference device. In this case, the processing unit 101 is configured to support the apparatus for determining device information in performing step 504 performed by the inference device in the foregoing embodiment. The communications unit 102 is configured to support the apparatus for determining device information in performing the sending action performed by the inference device in step 501 in the foregoing embodiment. The communications unit 102 is configured to support the apparatus for determining device information in performing the receiving action performed by the service discovery entity in step 503 in the foregoing embodiment.

In a possible embodiment, the processing unit 101 is specifically configured to support the apparatus for determining device information in performing step 5041 and step 5042 in the foregoing embodiment. The communications unit 102 is further configured to support the apparatus for determining device information in performing the sending action performed by the inference device in step 506 and step 509 in the foregoing embodiment.

In a possible embodiment, the communications unit 102 is further configured to support the apparatus for determining device information in performing the receiving action performed by the inference device in step 508 in the foregoing embodiment.

In another example, the apparatus for determining device information is a service discovery entity, or a chip applied to a service discovery entity. In this case, the processing unit 101 is configured to support the apparatus for determining device information in performing step 502 performed by the service discovery entity in the foregoing embodiment. The communications unit 102 is configured to support the apparatus for determining device information in performing the receiving action performed by the service discovery entity in step 501 in the foregoing embodiment. The communications unit 102 is configured to support the apparatus for determining device information in performing the sending action performed by the service discovery entity in step 503 in the foregoing embodiment.

In a possible embodiment, the communications unit 102 is configured to support the apparatus for determining device information in performing the receiving action performed by the service discovery entity in step 505 in the foregoing embodiment.

In still another example, the apparatus for determining device information is a first training device, or a chip applied to a first training device. In this case, the communications unit 102 is configured to support the apparatus for determining device information in performing the receiving action performed by the first training device in step 506 and the sending action performed by the first training device in step 508 in the foregoing embodiment. The processing unit 101 is configured to support the apparatus for determining device information in performing step 507 in the foregoing embodiment.

In a possible embodiment, the communications unit 102 is configured to support the apparatus for determining device information in performing the sending action performed by the first training device in step 505 in the foregoing embodiment. The communications unit 102 is configured to support the apparatus for determining device information in performing the receiving action performed by the first training device in step 506 in the foregoing embodiment.

Figure 8:
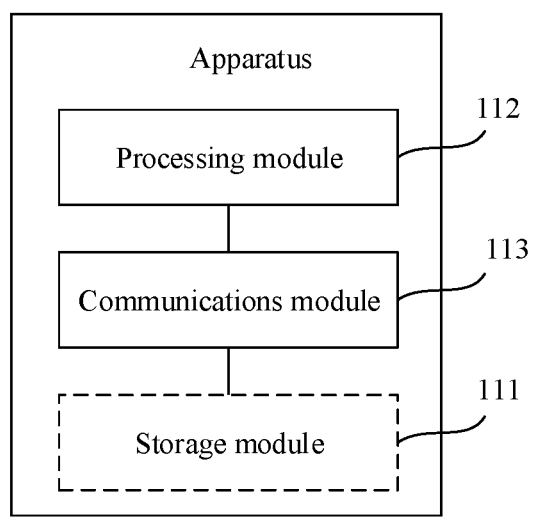
FIG. 8 is a schematic diagram of a structure of another apparatus according to an embodiment of this application.

When an integrated unit is used, FIG. 8 is a possible schematic diagram of a logical structure of an apparatus for determining device information in the foregoing embodiment. The apparatus for determining device information includes a processing module 112 and a communications module 113. The processing module 112 is configured to control and manage an action of the apparatus for determining device information. For example, the processing module 112 is configured to perform a step of processing information/data by the apparatus for determining device information. The communications module 113 is configured to support the apparatus for determining device information in performing a step of sending or receiving information/data.

In a possible embodiment, the apparatus for determining device information may further include a storage module 111, configured to store program code and/or data of the apparatus for determining device information.

In an example, the apparatus for determining device information is an inference device, or a chip applied to an inference device. In this case, the processing module 112 is configured to support the apparatus for determining device information in performing step 504 performed by the inference device in the foregoing embodiment. The communications module 113 is configured to support the apparatus for determining device information in performing the sending action performed by the inference device in step 501 in the foregoing embodiment. The communications module 113 is configured to support the apparatus for determining device information in performing the receiving action performed by the inference device in step 503 in the foregoing embodiment.

In a possible embodiment, the processing module 112 is specifically configured to support the apparatus for determining device information in performing step 5041 and step 5042 in the foregoing embodiment. The communications module 113 is further configured to support the apparatus for determining device information in performing the sending action performed by the inference device in step 506 and step 509 in the foregoing embodiment.

In a possible embodiment, the communications module 113 is further configured to support the apparatus for determining device information in performing the receiving action performed by the inference device in step 508 in the foregoing embodiment.

In another example, the apparatus for determining device information is a service discovery entity, or a chip applied to a service discovery entity. In this case, the processing module 112 is configured to support the apparatus for determining device information in performing step 502 performed by the service discovery entity in the foregoing embodiment. The communications module 113 is configured to support the apparatus for determining device information in performing the receiving action performed by the service discovery entity in step 501 in the foregoing embodiment. The communications module 113 is configured to support the apparatus for determining device information in performing the sending action performed by the service discovery entity in step 503 in the foregoing embodiment.

In a possible embodiment, the communications module 113 is configured to support the apparatus for determining device information in performing the receiving action performed by the service discovery entity in step 505 in the foregoing embodiment.

In still another example, the apparatus for determining device information is a first training device, or a chip applied to a first training device. In this case, the communications module 113 is configured to support the apparatus for determining device information in performing the receiving action performed by the first training device in step 506 and the sending action performed by the first training device in step 508 in the foregoing embodiment. The processing module 112 is configured to support the apparatus for determining device information in performing step 507 in the foregoing embodiment.

In a possible embodiment, the communications module 113 is configured to support the apparatus for determining device information in performing the sending action performed by the first training device in step 505 in the foregoing embodiment. The communications module 113 is configured to support the apparatus for determining device information in performing the receiving action performed by the first training device in step 506 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

When the processing module 112 is the processor 41 or the processor 45, the communications module 113 is the communications interface 43, and the storage module 111 is the memory 42, the apparatus for determining device information in this application may be the communications device shown in FIG. 4.

In an example, the apparatus for determining device information is the inference device, or the chip applied to the inference device. In this case, the processor 41 or the processor 45 is configured to support the apparatus for determining device information in performing step 504 performed by the inference device in the foregoing embodiment. The communications interface 43 is configured to support the apparatus for determining device information in performing the sending action performed by the inference device in step 501 in the foregoing embodiment. The communications interface 43 is configured to support the apparatus for determining device information in performing the receiving action performed by the service discovery entity in step 503 in the foregoing embodiment.

In a possible embodiment, the processor 41 or the processor 45 is specifically configured to support the apparatus for determining device information in performing step 5041 and step 5042 in the foregoing embodiment. The communications interface 43 is further configured to support the apparatus for determining device information in performing the sending action performed by the inference device in step 506 and step 509 in the foregoing embodiment.

In a possible embodiment, the communications interface 43 is further configured to support the apparatus for determining device information in performing the receiving action performed by the inference device in step 508 in the foregoing embodiment.

In another example, the apparatus for determining device information is a service discovery entity, or a chip applied to a service discovery entity. In this case, the processor 41 or the processor 45 is configured to support the apparatus for determining device information in performing step 502 performed by the service discovery entity in the foregoing embodiment. The communications interface 43 is configured to support the apparatus for determining device information in performing the receiving action performed by the service discovery entity in step 501 in the foregoing embodiment. The communications interface 43 is configured to support the apparatus for determining device information in performing the sending action performed by the service discovery entity in step 503 in the foregoing embodiment.

In a possible embodiment, the communications interface 43 is configured to support the apparatus for determining device information in performing the receiving action performed by the service discovery entity in step 505 in the foregoing embodiment.

In still another example, the apparatus for determining device information is the first training device, or the chip applied to the first training device. In this case, the communications interface 43 is configured to support the apparatus for determining device information in performing the receiving action performed by the first training device in step 506 and the sending action performed by the first training device in step 508 in the foregoing embodiment. The processor 41 or the processor 45 is configured to support the apparatus for determining device information in performing step 507 in the foregoing embodiment.

In a possible embodiment, the communications interface 43 is configured to support the apparatus for determining device information in performing the sending action performed by the first training device in step 505 in the foregoing embodiment. The communications interface 43 is configured to support the apparatus for determining device information in performing the receiving action performed by the first training device in step 506 in the foregoing embodiment.

Figure 9:
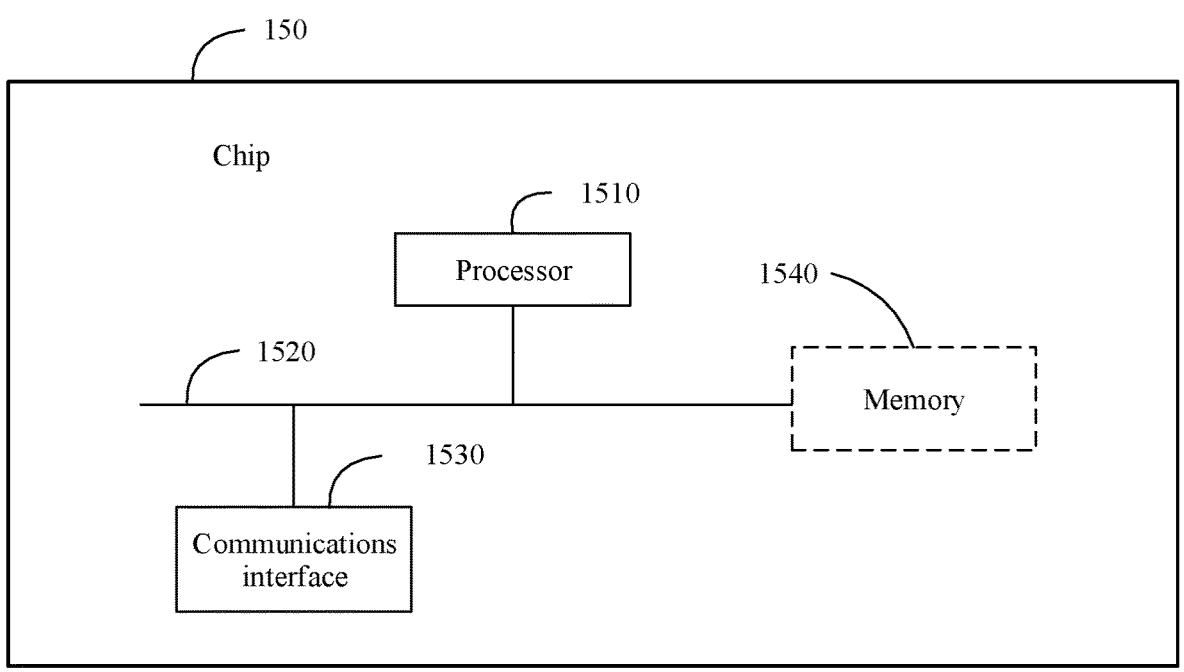
FIG. 9 is a schematic diagram of a structure of a chip according to an embodiment of this application.

FIG. 9 is a schematic diagram of a structure of a chip 150 according to an embodiment of this application. The chip 150 includes one or more (including two) processors 1510 and a communications interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (non-volatile random access memory, NVRAM).

In some implementations, the memory 1540 stores the following elements: an executable module or a data structure, a subset thereof, or an extended set thereof.

In this embodiment of this application, a corresponding operation is performed by invoking the operation instructions (where the operation instructions may be stored in an operating system) stored in the memory 1540.

In a possible implementation, chips used in a first training device, an inference device, and a service discovery entity have similar structures, and different apparatuses may use different chips to implement respective functions.

The processor 1510 controls a processing operation of any one of the first training device, the inference device, and the service discovery entity. The processor 1510 may also be referred to as a central processing unit (central processing unit, CPU).

The memory 1540 may include a read-only memory and a random access memory, and provide instructions and data for the processor 1510. A part of the memory 1540 may further include an NVRAM. For example, in an application, the memory 1540, the communications interface 1530, and the memory 1540 are coupled together through a bus system 1520. The bus system 1520 may further include a power bus, a control bus, a status signal bus, and the like in addition to a data bus. However, for clear descriptions, various buses are marked as the bus system 1520 in FIG. 9.

The methods disclosed in the foregoing embodiments of this application may be applied to the processor 1510, or may be implemented by the processor 1510. The processor 1510 may be an integrated circuit chip and has a signal processing capability. In an implementation process, steps in the foregoing methods may be implemented by using a hardware integrated logical circuit in the processor 1510, or by using instructions in a form of software. The processor 1510 may be a general-purpose processor, a digital signal processor (digital signal processor, DSP), an ASIC, a field-programmable gate array (field-programmable gate array, FPGA) or another programmable logic device, a discrete gate or a transistor logic device, or a discrete hardware component. The methods, the steps, and logic block diagrams that are disclosed in embodiments of this application may be implemented or performed. The general-purpose processor may be a microprocessor, or the processor may be any conventional processor or the like. The steps of the methods disclosed with reference to embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, a register, or the like. The storage medium is located in the memory 1540, and the processor 1510 reads information in the memory 1540 and completes the steps in the foregoing methods in combination with hardware of the processor 1510.

In a possible implementation, the communications interface 1530 is configured to perform receiving and sending steps of the first training device, the inference device, and the service discovery entity in embodiments shown in FIG. 5 and FIG. 6. The processor 1510 is configured to perform processing steps of the first training device, the inference device, and the service discovery entity in embodiments shown in FIG. 5 and FIG. 6.

The communications unit may be a communications interface of the apparatus, and is configured to receive a signal from another apparatus. For example, when the apparatus is implemented as a chip, the communications unit is a communications interface used by the chip to receive a signal from another chip or apparatus or send a signal to another chip or apparatus.

In addition, an embodiment of this application may provide a computer-readable storage medium. The computer-readable storage medium stores instructions. When the instructions are run, a function of the service discovery entity in FIG. 5 and FIG. 6 is implemented.

An embodiment of this application provides a computer-readable storage medium. The computer-readable storage medium stores instructions. When the instructions are run, a function of the inference device in FIG. 5 and FIG. 6 is implemented.

An embodiment of this application provides a computer-readable storage medium. The computer-readable storage medium stores instructions. When the instructions are run, a function of the first training device in FIG. 5 and FIG. 6 is implemented.

An embodiment of this application provides a computer program product including instructions. The computer program product includes the instructions, and when the instructions are run, a function of the service discovery entity in FIG. 5 and FIG. 6 is implemented.

An embodiment of this application provides a computer program product including instructions. The computer program product includes the instructions, and when the instructions are run, a function of the inference device in FIG. 5 and FIG. 6 is implemented.

An embodiment of this application provides a computer program product including instructions. The computer program product includes the instructions, and when the instructions are run, a function of the first training device in FIG. 5 and FIG. 6 is implemented.

An embodiment of this application provides a chip. The chip is applied to a first training device. The chip includes at least one processor and a communications interface, the communications interface is coupled to the at least one processor, and the processor is configured to run instructions, so as to implement a function of the first training device in FIG. 5 and FIG. 6.

An embodiment of this application provides a chip. The chip is applied to an inference device. The chip includes at least one processor and a communications interface, the communications interface is coupled to the at least one processor, and the processor is configured to run instructions, so as to implement a function of the inference device in FIG. 5 and FIG. 6.

An embodiment of this application provides a chip. The chip is applied to a service discovery entity. The chip includes at least one processor and a communications interface, the communications interface is coupled to the at least one processor, and the processor is configured to run instructions, so as to implement a function of the service discovery entity in FIG. 5 and FIG. 6.

An embodiment of this application provides a communications system. The communications system includes an inference device and a service discovery entity. The service discovery entity is configured to perform the steps performed by the service discovery entity in FIG. 5 to FIG. 7, and the inference device is configured to perform the steps performed by the inference device in FIG. 5 and FIG. 6.

In an optional implementation, the communications system may further include a first training device, configured to perform the steps performed by the first training device in FIG. 5 and FIG. 6.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of the procedures or functions in the embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (digital video disc, DVD), or may be a semiconductor medium, for example, a solid state drive (solid state drive, SSD).

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and the embodiments thereof, it is clearly that various modifications and combinations may be made to them without departing from the scope of this application. Correspondingly, the specification and accompanying drawings are merely example description of this application defined by the appended claims, and is considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method for determining device information, comprising:
    sending, by an inference device, a first request to a service discovery entity, wherein the first request requests information about one or more training devices included in the service discovery entity, and the first request comprises an algorithm type or an algorithm identifier of a first model requested by the inference device;
    receiving, by the inference device, the information about the one or more training devices from the service discovery entity, wherein the information about the one or more training devices comprises capability information, and the information about the one or more training devices is determined by the service discovery entity based on the algorithm type or the algorithm identifier of the first model requested by the inference device;
    determining, by the inference device, a first training device from the information about the one or more training devices based on a preset condition; and
    sending, by the inference device, a third request to the service discovery entity, wherein the third request requests to register or update the information about the first model, and the third request comprises any one or more of the following information:
        an analytics ID corresponding to the first model, an effective area, a service area, or a coverage area of an analytics corresponding to the first model.

2. The method according to claim 1, wherein the capability information comprises any one or more of an algorithm type, an algorithm identifier, an algorithm performance evaluation indicator, algorithm convergence time, an algorithm convergence speed, or algorithm confidence.

3. The method according to claim 1, wherein the preset condition comprises any one or more of the following:
    algorithm convergence time corresponding to an algorithm of the first training device is the fastest in algorithm convergence time corresponding to an algorithm of any one of the one or more training devices; or
    an algorithm performance evaluation indicator corresponding to an algorithm of the first training device is the highest in an algorithm performance evaluation indicator corresponding to an algorithm of any one of the training devices.

4. The method according to claim 3, wherein the information about the one or more training devices further comprises any one of location information or load information, and the preset condition further comprises:
    load of the first training device is the lowest in load of the one or more training devices.

5. The method according to claim 1, wherein the method further comprises:
    sending, by the inference device, a fourth request to the first training device, wherein the fourth request requests information about the first model, and the fourth request comprises any one or more of the following information corresponding to the first model: the algorithm type, the algorithm identifier, an algorithm performance requirement, a data type, or a data address; and
    receiving, by the inference device, the information about the first model from the first training device, wherein the information about the first model comprises any one or more of a model identifier, a model input, or a model parameter.

6. The method according to claim 5, wherein the information about the first model further comprises any one or more of a model output, additional model information, or a result of a model evaluation indicator.

7. A communication apparatus, comprising at least one processor and a memory, wherein the memory stores computer instructions for execution by the at least one processor to cause the communication apparatus to:
    send a first request to a service discovery entity, wherein the first request requests information about one or more training devices included in the service discovery entity, and the first request comprises an algorithm type or an algorithm identifier of a first model requested by the communication apparatus;
    receive the information about the one or more training devices from the service discovery entity, wherein the information about the one or more training devices comprises capability information, and the information about the one or more training devices is determined by the service discovery entity based on the algorithm type or the algorithm identifier of the first model requested by the communication apparatus;

determine a first training device from the information about the one or more training devices based on a preset condition; and sending a third request to the service discovery entity, wherein the third request requests to register or update the information about the first model, and the third request comprises any one or more of the following information:

an analytics ID corresponding to the first model, an effective area, a service area, or a coverage area of an analytics corresponding to the first model.

8. The communication apparatus according to claim 7, wherein the capability information comprises any one or more of an algorithm type, an algorithm identifier, an algorithm performance evaluation indicator, algorithm convergence time, an algorithm convergence speed, or algorithm confidence.

9. The communication apparatus according to claim 7, wherein the preset condition comprises any one or more of the following:
  algorithm convergence time corresponding to an algorithm of the first training device is the fastest in algorithm convergence time corresponding to an algorithm of any one of the one or more training devices; or
  an algorithm performance evaluation indicator corresponding to an algorithm of the first training device is the highest in an algorithm performance evaluation indicator corresponding to an algorithm of any one of the training devices.

10. The communication apparatus according to claim 9, wherein the information about the one or more training devices further comprises any one of location information or load information, and the preset condition further comprise:
  load of the first training device is the lowest in load of the one or more training devices.

11. The communication apparatus according to claim 7, wherein the computer instructions are for execution by the at least one processor to cause the communication apparatus to:
  send a fourth request to the first training device, wherein the fourth request requests information about the first model, and the fourth request comprises any one or more of the following information corresponding to the first model: the algorithm type, the algorithm identifier, an algorithm performance requirement, a data type, or a data address; and
  receive the information about the first model from the first training device, wherein the information about the first model comprises any one or more of a model identifier, a model input, or a model parameter.

12. The communication apparatus according to claim 11, wherein the information about the first model further comprises any one or more of a model output, additional model information, or a result of a model evaluation indicator.

13. A communication system, comprising:
  an inference device, comprising: at least one processor and a memory, wherein the memory stores computer instructions for execution by the at least one processor to cause the inference device to:
    send a first request to a service discovery entity, wherein the first request requests information about one or more training devices included in the service discovery entity, and the first request comprises an algorithm type or an algorithm identifier of a first model requested by the inference device;
    receive the information about the one or more training devices from the service discovery entity, wherein the information about the one or more training devices comprises capability information, and the information about the one or more training devices is determined by the service discovery entity based on the algorithm type or the algorithm identifier of the first model requested by the inference device;
    determine a first training device from the information about the one or more training devices based on a preset condition; and
    send a third request to the service discovery entity, wherein the third request requests to register or update the information about the first model, and the third request comprises any one or more of the following information:
      an analytics ID corresponding to the first model, an effective area, a service area, or a coverage area of an analytics corresponding to the first model; and
  the service discovery entity, configured to receive the first request from the inference device.

14. The communication system according to claim 13, wherein the capability information comprises any one or more of an algorithm type, an algorithm identifier, an algorithm performance evaluation indicator, algorithm convergence time, an algorithm convergence speed, or algorithm confidence.

15. The communication system according to claim 13, wherein the preset condition comprises any one or more of the following:
  algorithm convergence time corresponding to an algorithm of the first training device is the fastest in algorithm convergence time corresponding to an algorithm of any one of the one or more training devices; or
  an algorithm performance evaluation indicator corresponding to an algorithm of the first training device is the highest in an algorithm performance evaluation indicator corresponding to an algorithm of any one of the training devices.

16. The communication system according to claim 15, wherein the information about the one or more training devices further comprises any one of location information or load information, and the preset condition further comprise:
  load of the first training device is the lowest in load of the one or more training devices.

17. The communication system according to claim 13, wherein the computer instructions are for execution by the at least one processor to cause the inference device to:
  send a fourth request to the first training device, wherein the fourth request requests information about the first model, and the fourth request comprises any one or more of the following information corresponding to the first model: the algorithm type, the algorithm identifier, an algorithm performance requirement, a data type, or a data address; and
  receive the information about the first model from the first training device, wherein the information about the first model comprises any one or more of a model identifier, a model input, or a model parameter.

* * * * *